United States Patent [19]
Lee et al.

[11] Patent Number: 5,619,741
[45] Date of Patent: Apr. 8, 1997

[54] SHUTTER DRIVING SYSTEM FOR A CAMERA

[75] Inventors: Seon-ho Lee; Jae-kyeong Seo, both of Kyeongsangnam-do, Rep. of Korea

[73] Assignee: Samsung Aerospace Industries, Ltd., Kyeongsangnam-do, Rep. of Korea

[21] Appl. No.: 683,820

[22] Filed: Jul. 18, 1996

Related U.S. Application Data

[63] Continuation of Ser. No. 277,613, Jul. 20, 1994, abandoned.

[30] Foreign Application Priority Data

Jul. 21, 1993 [KR] Rep. of Korea .................. 93-13787
Jun. 11, 1994 [KR] Rep. of Korea .................. 94-13543

[51] Int. Cl.$^6$ ........................................... G03B 9/08
[52] U.S. Cl. ..................................................... 396/463
[58] Field of Search ............................. 354/234.1, 271.1, 354/274, 261.26

[56] References Cited

U.S. PATENT DOCUMENTS

| | | | |
|---|---|---|---|
| 5,032,859 | 7/1991 | Akimoto et al. | 354/195.1 |
| 5,060,000 | 10/1991 | Ogihara et al. | 354/400 |
| 5,177,523 | 1/1993 | Huang et al. | 354/400 |
| 5,416,547 | 5/1995 | SanGregory et al. | 354/195.11 |
| 5,420,660 | 5/1995 | Akimoto et al. | 354/400 |

*Primary Examiner*—Safet Metjahic
*Assistant Examiner*—Daniel Chapik
*Attorney, Agent, or Firm*—Finnegan, Henderson, Farabow, Garrett & Dunner, L.L.P.

[57] ABSTRACT

A shutter driving system for a camera including a motor gear, an automatic exposing gear, an opening lever, an automatic focusing gear, an automatic focusing ring, and a locking member. The system controls the locking member for accurate automatic focusing.

6 Claims, 8 Drawing Sheets

SHUTTER DRIVING SYSTEM FOR A CAMERA

This is a continuation of application Ser. No. 08/277,613, filed Jul. 20, 1994 now abandoned.

BACKGROUND OF THE INVENTION

1. Field of the Invention

The present invention relates generally to a shutter driving system for a camera, and more particularly to a shutter driving system that provides for accurate automatic focusing.

2. Description of Related Art

A proposed camera has a lens shutter driven by a fast motor of a diaphragm and shutter for a suitable exposure amount includes combined shutter blades and diaphragm, an opening lever for opening or closing the shutter blades at a closing position of a shutter opening and a diaphragm set position, a diaphragm ring having a cam portion for setting an operation position of the opening lever in advance, a driving ring followed by an operation of the opening lever and having a steeply slant face by the cam portion, a motor for operating the diaphragm ring and the driving ring, additionally a ratchet for an automatic focusing, and an engagement lever for locking the ratchet by an armature selectively attracted to an electromagnet.

In this proposed camera, automatic focusing is performed by locking the diaphragm ring after the electromagnet is magnetized when the diaphragm ring is operated by the driving ring rotated in response to a forward rotation of the motor and comes to a calculated number. The driving ring is rotated clockwise in accordance with an F number set in advance in accordance with a rearward rotation of the motor, and the opening lever is operated by the cam portion having the steeply slant face, thereby an automatic exposing can be embodied.

Since the engagement lever for locking the ratchet is locked in one step per one pitch in response to an ON/OFF operation of the armature, and rebound impact power is caused by a spring when the automatic focusing is carried out, it is difficult to secure the exact focusing position. In addition, since a shutter open time is decided by the driving ring having the cam portion with the steeply slant face contacting the opening lever for controlling the operation of the shutter blades, a response speed of the opening lever for controlling an opening or closing time of the shutter blades is delayed, such that a clear image of an object can be obtained as the shutter open state is maintained for a long period of time.

SUMMARY OF THE INVENTION

The object of the present invention is to overcome the problems and disadvantages of described above.

To achieve this and other objects of the present invention, a shutter driving system for a camera, comprises a first gear for engaging with a driver; a second gear for engaging the first gear; a light shield; a lever for engaging the second gear and opening the light shield; a third gear for engaging the second gear; a ring for engaging the third gear and moving a lens; and means for locking the ring.

According to another aspect of the present invention, in a shutter driving system having a first gear for engaging with a driver, a second gear for engaging the first gear, a light shield, a lever for engaging the second gear and opening the light shield, a third gear for engaging the second gear, a ring, engaged with the third gear, for moving a lens, a method of operating the system comprises the steps of rotating the second and third gears in a first direction; mechanically biasing the ring in a rotation direction; locking the ring; rotating the second gear in a second direction opposite the first direction; selectively engaging the second gear to the lever.

It is to be understood that both the foregoing general description and the following detailed description are exemplary and explanatory and are intended to provide further explanation of the invention as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the preferred embodiment of the invention, an example of which is illustrated in the accompanying drawings.

Figure 1:
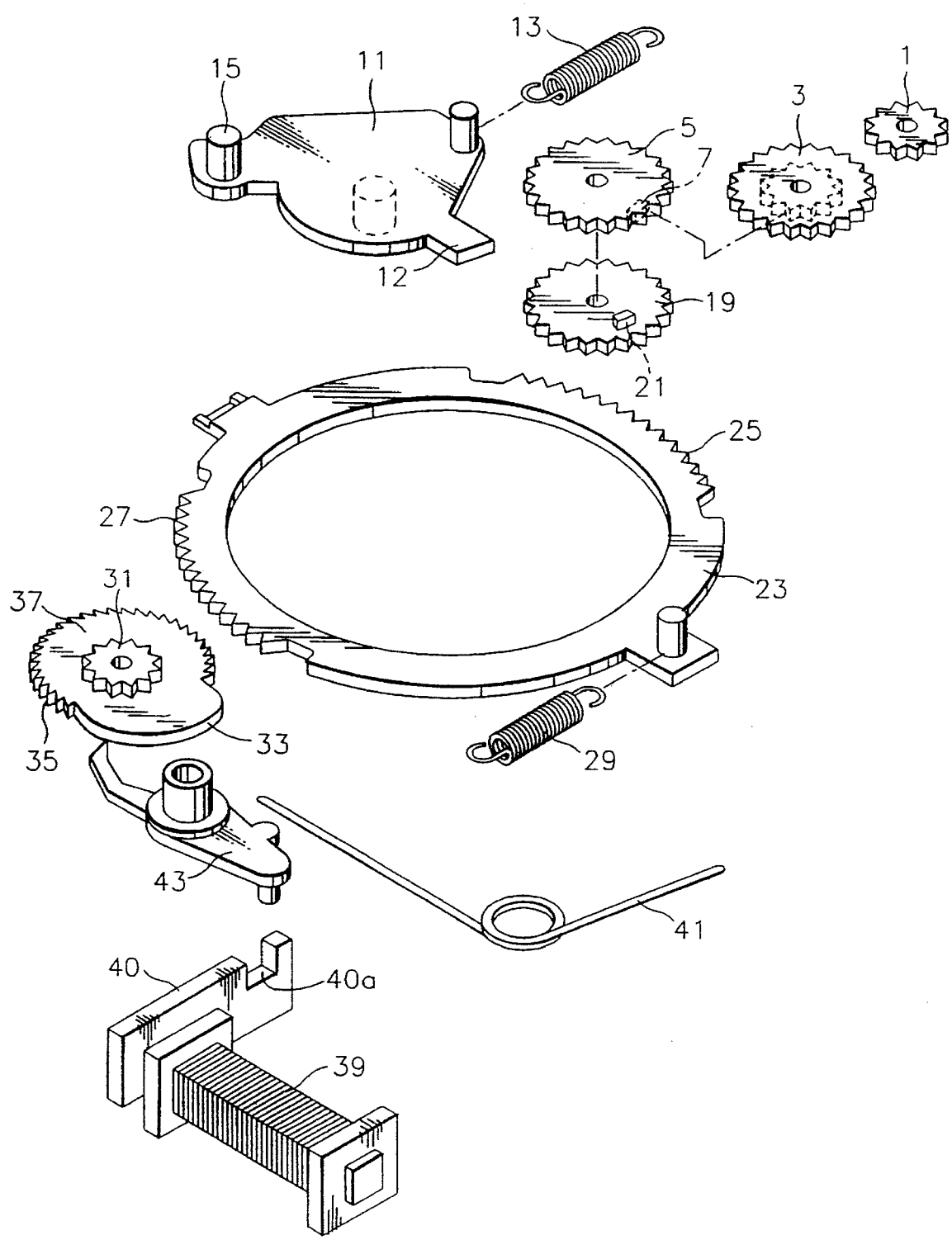
FIG. 1 is an exploded perspective view of a lens shutter driving system for a camera according to a preferred embodiment of the present invention.
Figure 2:
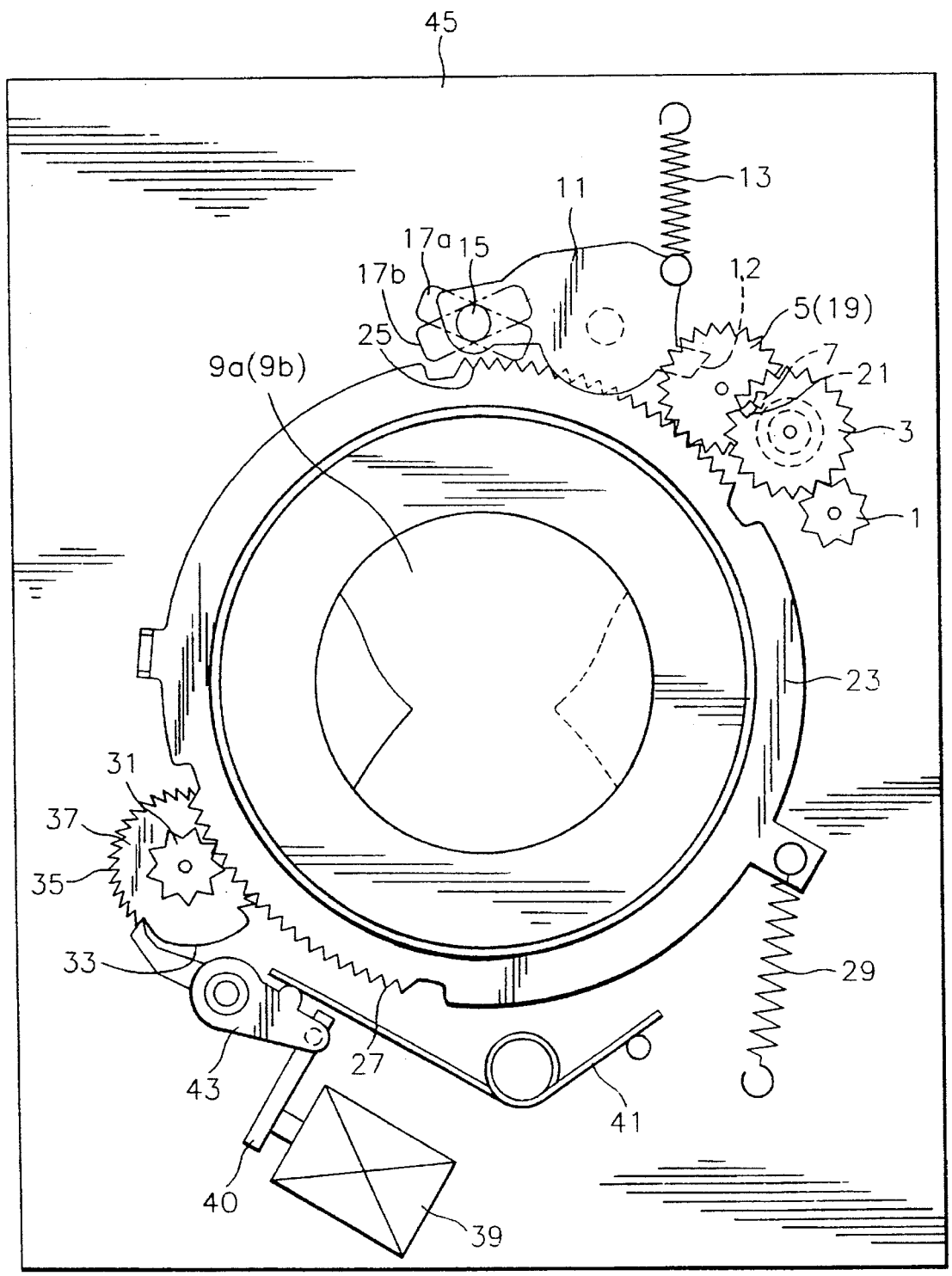
FIG. 2 is a plan view of a lens shutter driving system for a camera according to a preferred embodiment of the present invention.

Referring to FIGS. 1 and 2, a reference numeral 1 indicates a motor gear of a driver (not shown) for transmitting a turning effect.

The motor gear 1 is engaged into to an automatic exposing (AE) gear 5 to transmit the turning effect of the driver via a reduction gear 3 after reducing the turning effect of the driver to a predetermined rotation number.

The AE gear 5 has a projection 7 in one side thereof, and operates an opening lever 11 for selectively opening or closing shutter blades 9a, 9b, which operate as a light shield.

Figure 8A:
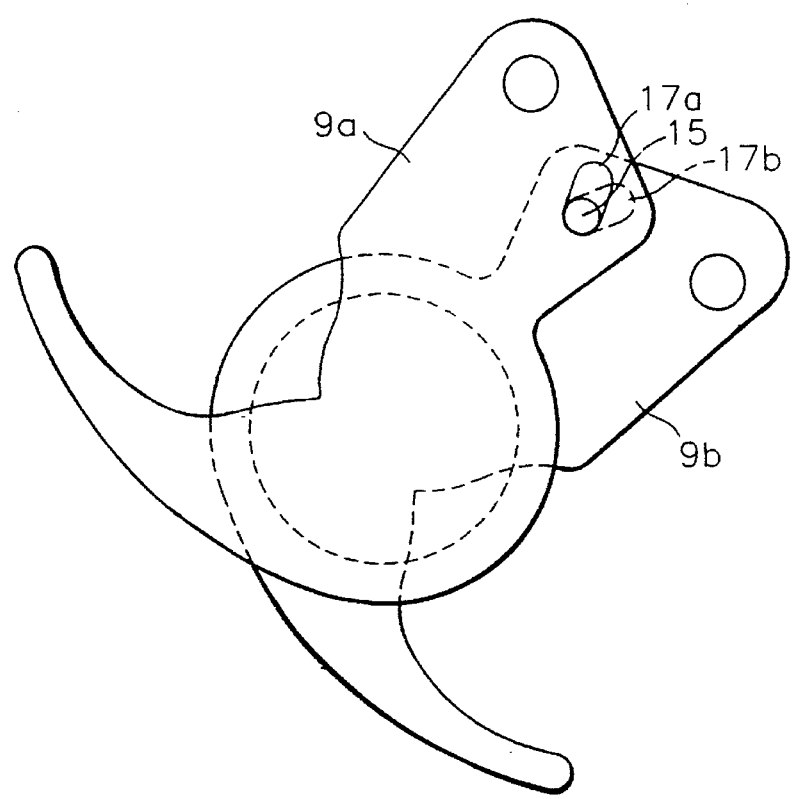
FIGS. 8A & 8B are views illustrating an operation state of shutter blades relating to the present invention.

The opening lever 11 is fixed by a hinge to move in an arc shape. The opening lever 11 has an operating projection 12 positioned in one side thereof and in a range in which contacts the projection 7 in the AE gear 5, and an elastical member 13 for restoring the opening lever to an initial state. An operating pin 15 is in the other side of the opening lever 11, is inserted into guide holes 17a, 17b of the shutter blades 9a, 9b fixed by the hinge to operate opposite to each other as shown in FIG. 8, thereby the opening or closing of the shutter blades are carried out in accordance with the operation of the opening lever 11.

Figure 3:
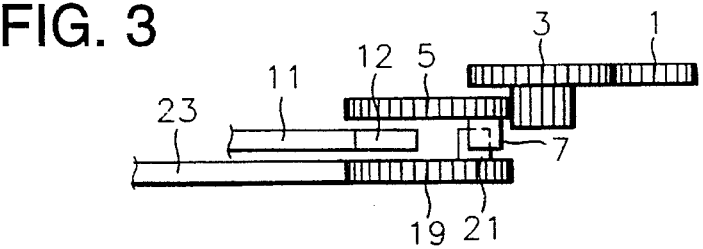
FIG. 3 is a side sectional view of main parts of a driving system relating to a preferred embodiment of the present invention.

An automatic focusing (AF) gear 19 operated in accordance with the operation of the AE gear 5 has a projection 21 at a position that contacts the projection 7 of the AE gear 5. The AF gear 19, is fixed on the same axis as AE gear 5, as shown in FIG. 3, and operates an automatic focusing ring 23 for moving a lens (not shown) forward spirally.

The AF ring 23 has a gear portion 25 engaged into the AF gear 19 in one side, and the other gear portion 27 in the opposite side, thereby transmits the turning effect to locking mechanism. A return spring 29 is elastically formed in one side of the AF ring 23, thereby giving the turning effect to the AF ring 23.

The locking mechanism 45 for locking a set position of the AF ring 23 includes a pinion 31 engaged into the gear portion 27, an automatic focusing lock gear 37 having a cam surface 33 in one side thereof and a ratchet 35 for locking one way rotation and extended from the cam surface, and an automatic focusing lock lever 43 locked in an engagement hole 40a of a magnetic plate 40 by selective magnetizing force of an automatic focusing magnet 39 in a predetermined position, is elastically formed by a twisted elastic member 41 and the upper portion thereof is selectively engaged into the ratchet 35, and the AF ring 23 is locked in a plurality of steps (in two steps in the embodiment of the present invention) by a calculated value of a distance measuring circuit (not shown), such that a focusing position of high accuracy can be obtained and rebound impact power caused by the elastical force of the twisted elastical member 41 can be overcome.

The operation of the locking mechanism 45 is as follows. First, a driving signal produced to a stepping motor of the driver in accordance with the calculated value by the distance measuring circuit is maintained to a corresponding position signal, thereby an overrun can be stabilized. After a predetermined time passes by, power applied to an automatic focusing magnet 39 (Referred as AF magnet hereinafter) of the locking mechanism 45 is cut off, thereby the AF lock lever is positioned at an optional, intermediate position in one pitch of the ratchet 35.

Secondly, the rebound impact by the locking of the AF lock lever 43 is prevented by continuously maintaining the driving signal to the corresponding position signal, such that the focusing position of high accuracy is secured. And again, power is applied to the stepping motor of the driver, such that an automatic exposing can be made.

Figure 4:
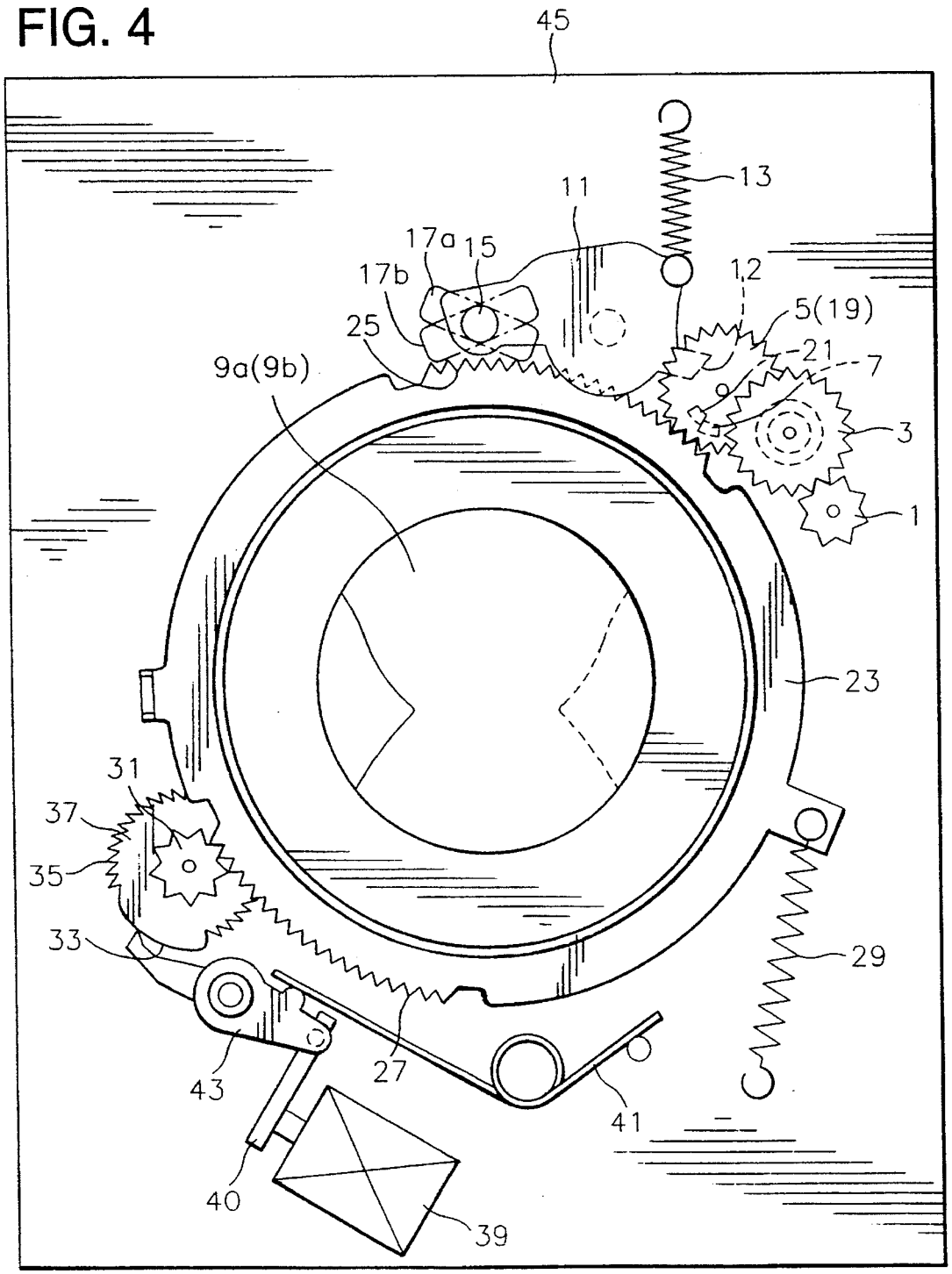
FIG. 4 is a plan view illustrating an operation state of a lens shutter driving system according to a preferred embodiment of the present invention.
Figure 7A:
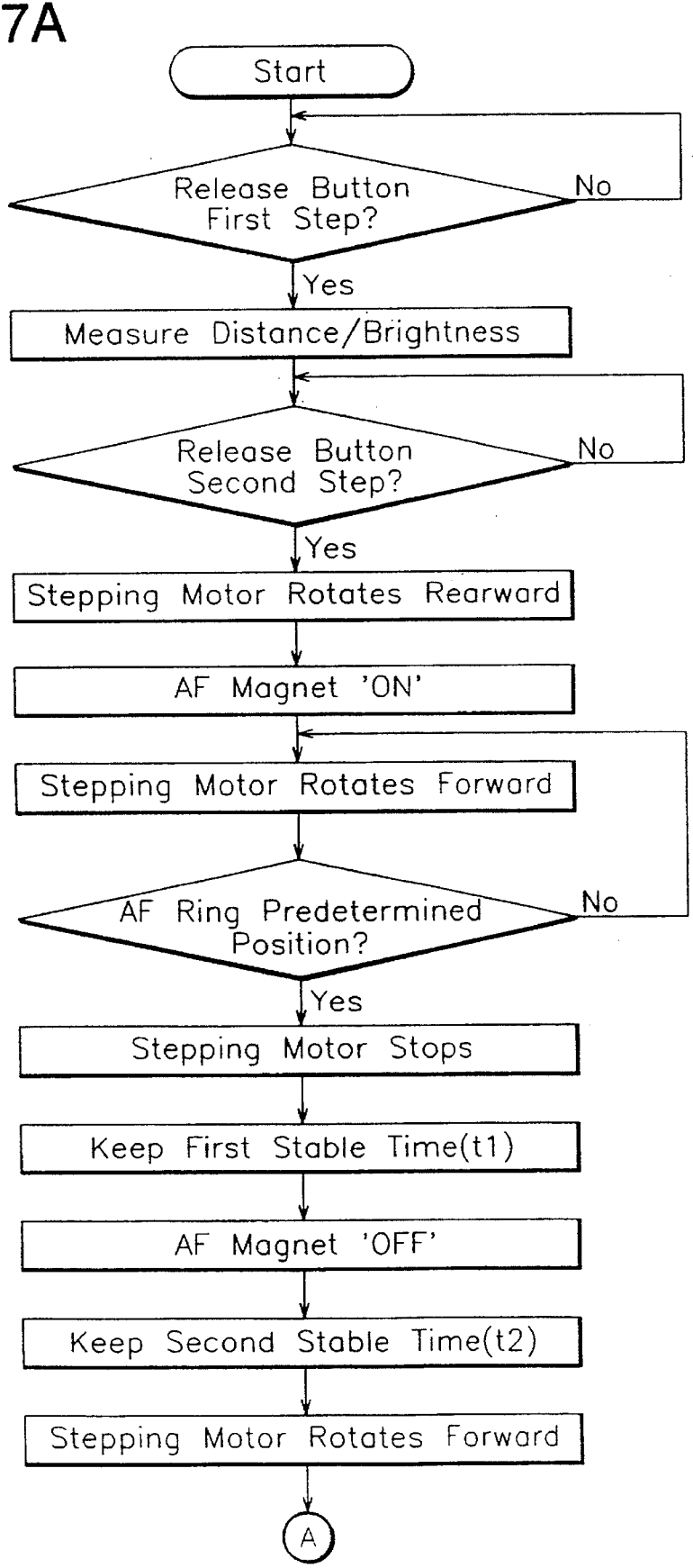
FIGS. 7A & 7B are flow charts showing an operation of the preferred shutter driving system.
Figure 7B:
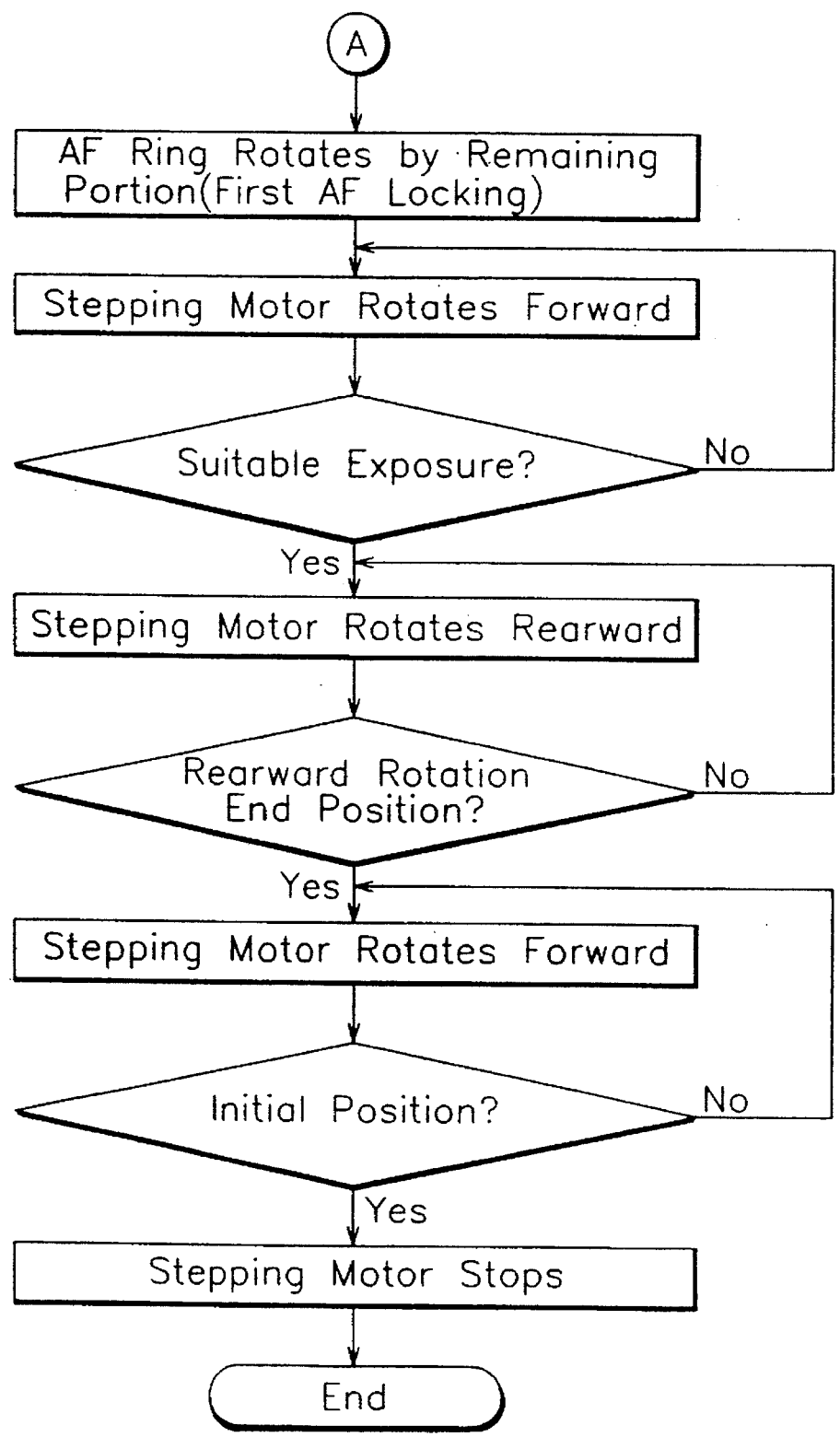

Referring to FIGS. 4 and 7, the operation of the lens shutter driving system for a camera according to a preferred embodiment of the present invention will be explained as the follows.

As the motor of the driver is rotated clockwise by a selective output signal of a driving circuit at a predetermined angle when a release button (not shown) is operated, the turning effect thereof is transmitted to a motor gear 1, is reduced by a reduction gear 3 engaged into the motor gear 1 to a predetermined rotation speed and is transmitted to the AE gear 5, and at the same time, the AF gear 19 is rotated by the projection 7 at one side of the AE gear 5 and the projection 21 of the AF gear 19 in the same direction.

As the AF gear 19 is rotated clockwise, the AF ring 23 engaged into the AF gear 19 is rotated counterclockwise, the AF lock gear 37 engaged into a gear portion 27 of the AF ring 23 is rotated clockwise, such that the AF lock lever 43 elastically supported by the twisted elastical member 41 is rotated beyond an operation range of the ratchet 35 for one way locking, along a cam surface 33 of the AF lock gear 37.

At this time, when the rotation of the stepping motor is finished at the predetermined angle, an electric output signal is produced to the AF magnet 39 from the driving circuit, and is magnetized, such that the AF lock lever 43 is locked by an engagement hole 40a of a magnetic plate 40 provided in the magnet 39 and the AF lock gear 37 engaged into the AF ring 23 maintains free rotation state.

When the output signal of the driving circuit indicates an opposite direction and the stepping motor of the driver is rotated counterclockwise, the AE gear 5 is rotated counterclockwise, and at the same time, the AF gear 19 engaged into the AF ring 23 is operated by restoring force of the returning spring 29 elastically supported at the AF ring in accordance with the operation of the AE gear 5.

Figure 5:
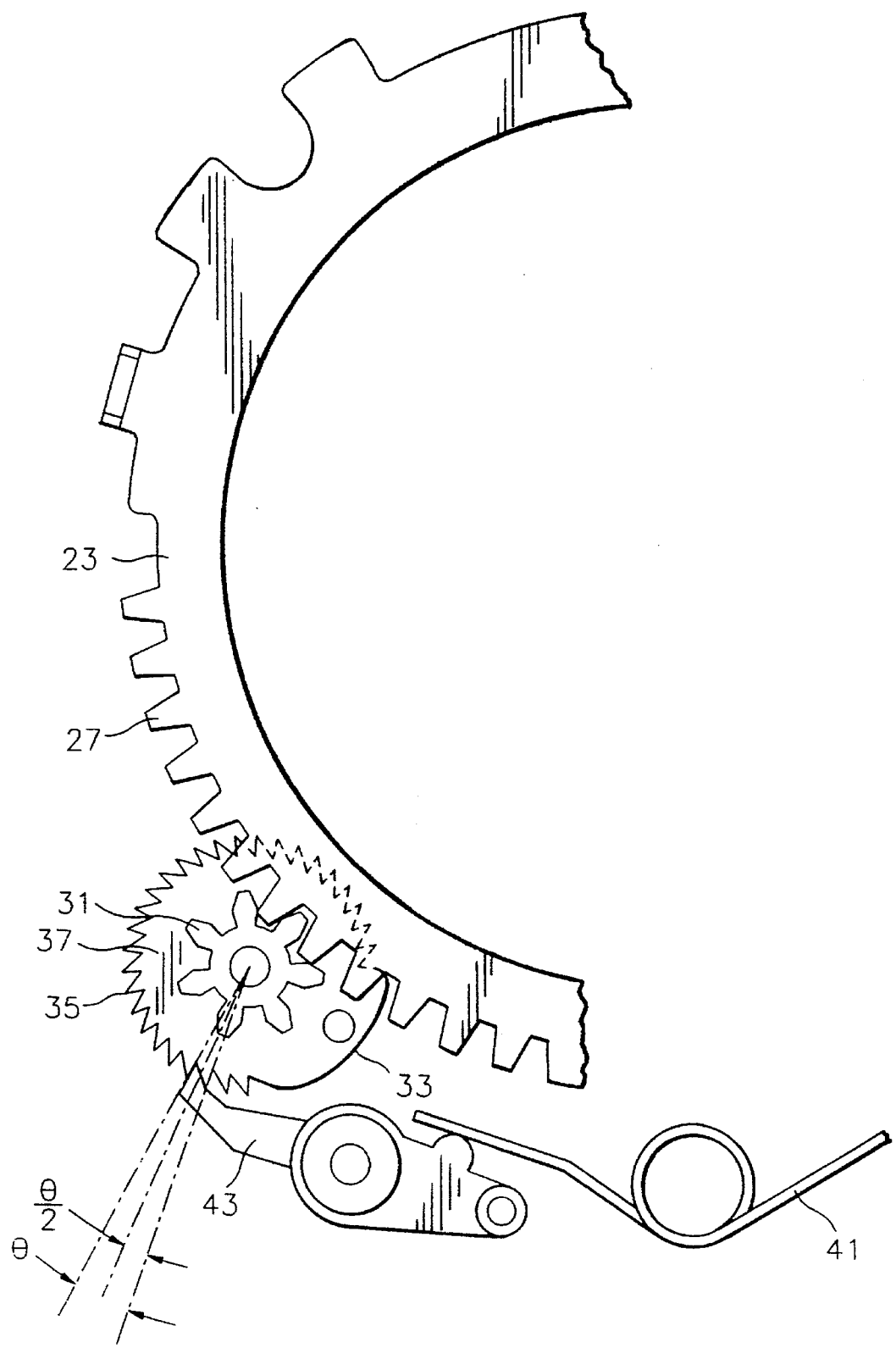
FIG. 5 is a timing diagram showing an operation of the preferred shutter driving system.
Figure 6:
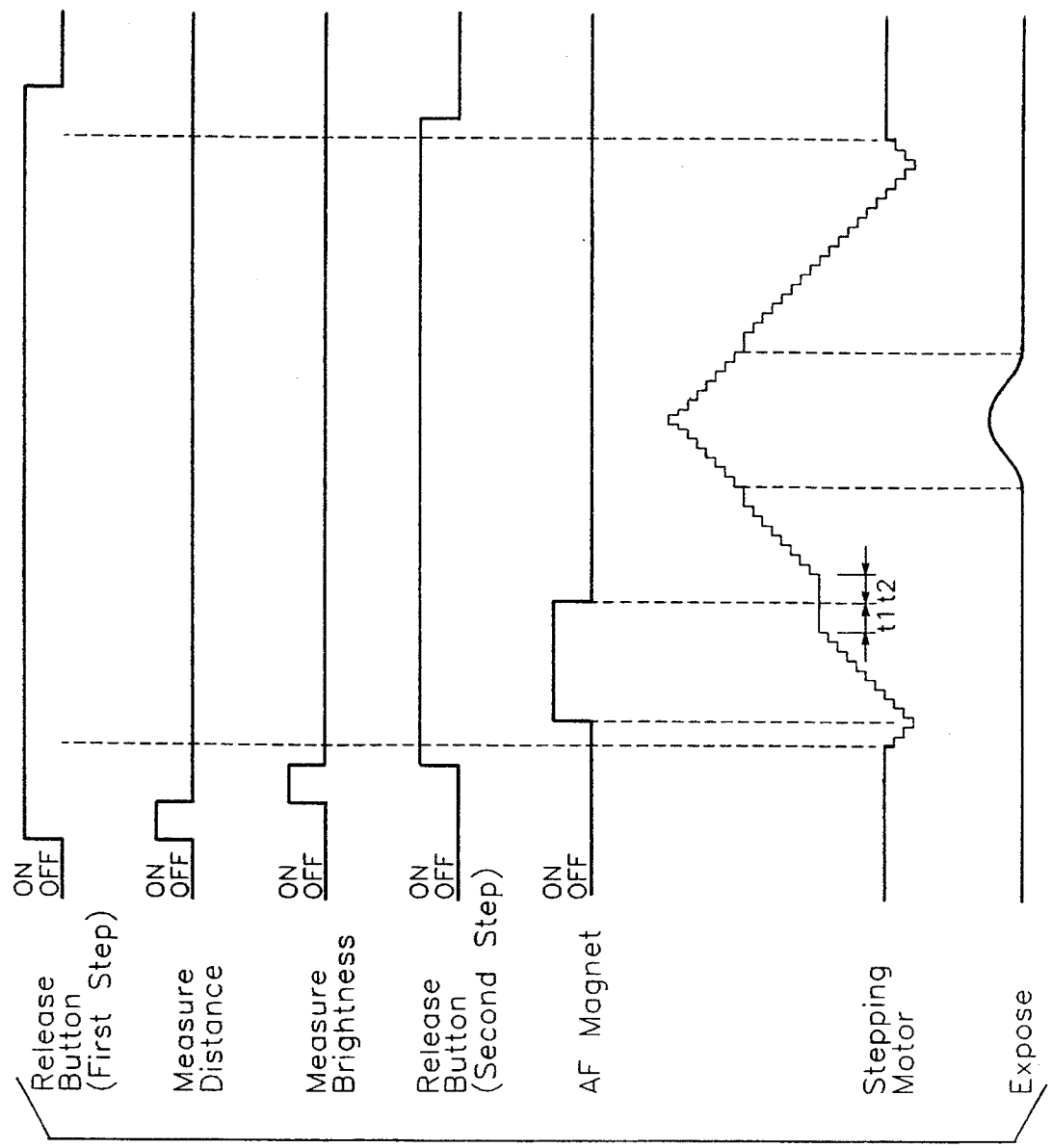
FIG. 6 is a time chart of a focusing mechanism relating to the present invention.

At this time, when the AF gear 19 reaches an automatic focusing position set by the calculated value from the distance measuring circuit, a first half stable time t1 for stabilizing the overrun of the stepping motor is maintained by keeping the power applied to the driver at that position signal. When this time t1 elapses, the AF lock lever 43 is rotated clockwise by the restoring force of the twisted elastical member 41 by cutting off the electric output signal applied to the AF magnet 39 locking the AF lock lever 43. As shown in FIG. 5, the AF lock lever 43 is positioned at an optional, intermediate position (in FIG. 5, poositioned at the θ/2 (theta/2) position) within a pitch of the ratchet 35.

In this state, the AF lock lever 43 is stabilized during a stable time of the rebound by the twisted elastical member 41, namely, during a second half stable time t2, and a complete engagement by the ratchet 35 is made at the optional, intermediate position.

And as the driving signal is again applied to the motor of the driver, the AF ring 23 is again made free, and is rotated by a remaining portion, in one pitch by the return spring 29, such that the automatic focusing of high accuracy can be embodied.

Figure 8B:
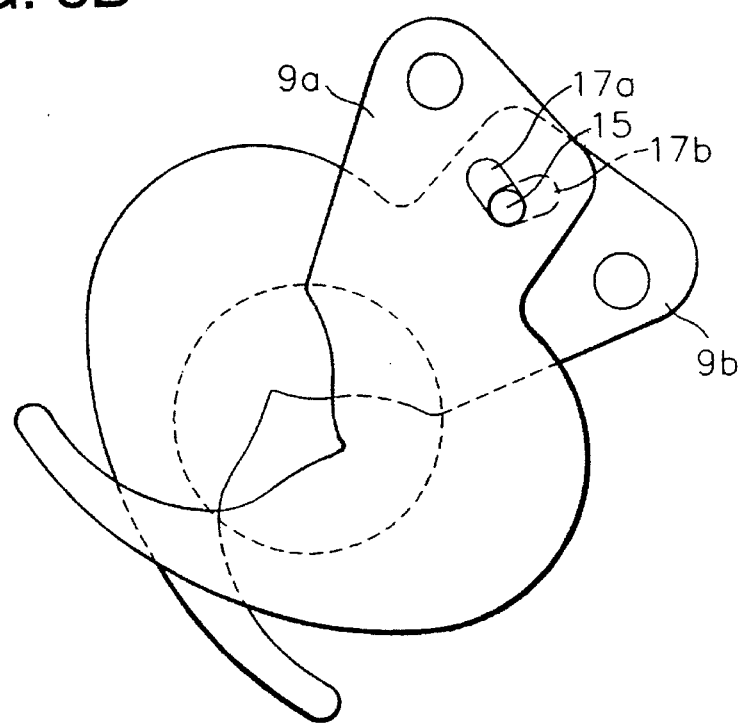

And as the driving signal is continuously applied to the motor of the driver, the AF ring 23 is continuously rotated. As the projection 7 at one side of the AE gear 5 overcomes the elastical force of the elastical member 13 elastically formed at an opening lever 11 and pushes an operating lever 12, an operating pin 15 in the other side of the opening lever 11 is displaced in an arc shape, such that the shutter blades 9a, 9b are opened as shown in FIG. 8B, and the automatic exposing by the calculation of an exposure value being incident from an object is carried out. An opening degree of the shutter blades 9a, 9b is controlled by adjusting a pivoting angle of the opening lever 11.

As the output signal of the driving circuit indicates an opposite direction after the automatic focusing is achieved, the motor of the driver rotated counterclockwise is rotated clockwise, the AE gear 5 is again rotated clockwise, and the shutter blades 9a, 9b return to an initial position by the restoring force of the elastical member 13 formed in the opening lever 11. As the AE gear 5 is continuously rotated, the projection 7 at one side thereof contacts the projection 21 in the AF gear 19 and is rotated clockwise, the AF ring 23 is rotated counterclockwise, such that one cycle is finished by the same operation to the initial one.

A series of operations like the above are repeated by an operational flow chart as shown in FIG. 7.

At this time, since an opening speed of the shutter blades 9a, 9b is a rotation speed of the driver for rotating the AE gear 5 counterclockwise and a closing speed is a speed of the motor of the driver of which the motor is rotated clockwise, if the shutter blades 9a, 9b are controlled to a maximum in accordance with a response speed of the motor, the opening or closing operation of the shutter blades 9a, 9b can be carried out rapidly, such that an ideal shutter driving system can be embodied and an ideal image of the object can be obtained.

As described above, the lens shutter driving system for a camera according to the preferred embodiment of the present invention has advantages as the following.

Since the stepping motor is controlled to the operation of the AF lock lever to carry out in two steps per one pitch of the ratchet when automatically focusing, the overrun of the stepping motor and the rebound impact power are absorbed, thereby the focusing of high accuracy can be embodied.

Since the speed of the stepping motor of the driver can be controlled in the maximum response speed when automatically focusing, the response speed of the opening lever is fast and the opening or closing speed of the shutter speed is carried out in a high speed, such that a clear image of the object can be obtained and trust on a product can be improved.

Since the AE ring is not needed and a construction of the camera is simple, a compact camera can be efficiently assembled.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A shutter driving system for a camera, comprising:
    a first gear for engaging with a motor gear;
    a second gear for engaging the first gear, the second gear having a face with a projection;
    a light shield;
    a lever for engaging the projection of the second gear and opening the light shield;
    a third gear having a face with a projection for contacting and engaging the projection of the second gear;
    a ring for engaging the third gear and moving a lens; and
    means for locking the ring.

2. The shutter driving system according to claim 1, further including means for actuating the locking means in synchronism with a control signal.

3. The shutter driving system according to claim 1, wherein the light shield defines a slot, and the lever includes
    a pin located in the slot;
    a projection, for selective engagement with the projection of the second gear, for rotating the body;
    means for mechanically biasing the lever toward an initial state.

4. The shutter driving system according to claim 1, wherein the locking means includes
    a pinion engaged with the ring;
    a ratchet coupled to the pinion;
    a lock lever opposite to the ratchet;
    means for mechanically biasing the lock lever;
    a magnet for selectively controlling a position of the lock lever; and
    means for contacting the ratchet at an intermediate position within a pitch of the ratchet to thereby actuate the locking means.

5. In a shutter driving system having a first gear for engaging with a motor gear, a second gear for engaging the first gear, the second gear having a face with a projection, a light shield, a lever for engaging the projection of the second gear and opening the light shield, a third gear having a face with a projection for contacting and engaging the projection of the second gear, a ring, engaged with the third gear, for moving a lens, a method of operating the system comprising the steps of:
    rotating the second and third gears in a first direction;
    mechanically biasing the ring in a rotation direction;
    locking the ring;
    rotating the second gear in a second direction opposite the first direction; and
    selectively engaging the second gear to the lever.

6. The shutter driving method according to claim 5, further including the step of controlling a magnetic actuator to selectively lock the ring.

* * * * *